United States Patent
Di Quadri et al.

(10) Patent No.: US 10,927,870 B2
(45) Date of Patent: Feb. 23, 2021

(54) FURNITURE ITEM

(71) Applicants: Francesco Catemario Di Quadri, Lisbon (PT); Efrem Cappelletti, Castagnola (CH); Fabio Sestito, Lugano (CH)

(72) Inventors: Francesco Catemario Di Quadri, Lisbon (PT); Efrem Cappelletti, Castagnola (CH); Fabio Sestito, Lugano (CH)

(*) Notice: Subject to any disclaimer, the term of this patent is extended or adjusted under 35 U.S.C. 154(b) by 0 days.

(21) Appl. No.: 16/155,149

(22) Filed: Oct. 9, 2018

(65) Prior Publication Data

US 2019/0107134 A1    Apr. 11, 2019

(30) Foreign Application Priority Data

Oct. 11, 2017    (GB) ..................................... 1716658

(51) Int. Cl.
| | |
|---|---|
| *F16B 12/28* | (2006.01) |
| *F16B 12/02* | (2006.01) |
| *F16B 12/50* | (2006.01) |
| *A47B 47/00* | (2006.01) |
| *A47B 47/04* | (2006.01) |
| *F16B 12/46* | (2006.01) |

(Continued)

(52) U.S. Cl.
CPC .......... *F16B 12/28* (2013.01); *A47B 47/0075* (2013.01); *A47B 47/042* (2013.01); *F16B 12/02* (2013.01); *F16B 12/24* (2013.01); *F16B 12/46* (2013.01); *F16B 12/50* (2013.01); *A47B 47/02* (2013.01)

(58) Field of Classification Search
CPC ........... F16B 12/28; F16B 12/50; F16B 12/02
USPC .......................................................... 52/645
See application file for complete search history.

(56) References Cited

U.S. PATENT DOCUMENTS

| | | | | |
|---|---|---|---|---|
| 2,330,824 A | * | 10/1943 | Granfield .............. | H01F 27/245 29/609 |
| 3,408,772 A | * | 11/1968 | Frehse .................. | F25D 23/087 312/296 |

(Continued)

FOREIGN PATENT DOCUMENTS

| | | |
|---|---|---|
| CN | 103625739 A | 3/2014 |
| CN | 204323883 U | 5/2015 |

(Continued)

OTHER PUBLICATIONS

Search Report for GB18199961.6, dated Dec. 5, 2018 (8 pp.).
Search Report for GB1716658.8, dated Mar. 28, 2018 (5 pp.).

*Primary Examiner* — Brian D Mattei
*Assistant Examiner* — Joseph J. Sadlon
(74) *Attorney, Agent, or Firm* — Eversheds Sutherland (US) LLP (57) ABSTRACT

The present disclosure relates to modular furniture made from a number of substantially flat panels. The panels have bevelled edges and magnets are disposed in or on the bevelled edges. Multiple panels thus may be joined together magnetically to construct a piece of furniture. In some examples, the outward pointing poles of adjacent magnets alternate (North, South, North South, etc.) around the panel. In some examples, there are protrusions and depressions on some or all bevelled edges, such that a protrusion of one panel can mate with the depression of another panel so as to resist the bevelled edges sliding past each other.

12 Claims, 8 Drawing Sheets

(51) Int. Cl.
*F16B 12/24* (2006.01)
*A47B 47/02* (2006.01)

(56) References Cited

U.S. PATENT DOCUMENTS

| | | | | |
|---|---|---|---|---|
| 3,862,515 | A * | 1/1975 | Baermann | E05C 19/161 |
| | | | | 49/478.1 |
| 4,403,554 | A * | 9/1983 | Valentine | A47F 5/10 |
| | | | | 108/180 |
| 5,466,058 | A * | 11/1995 | Chan | A47B 47/0075 |
| | | | | 312/111 |
| 7,472,969 | B2 * | 1/2009 | Saravis | A47B 47/0033 |
| | | | | 312/111 |
| 8,186,776 | B2 * | 5/2012 | Zalewski | A47B 47/0041 |
| | | | | 312/107 |
| 9,124,308 | B2 * | 9/2015 | Metcalf | A47C 7/72 |
| 9,277,813 | B2 * | 3/2016 | Nelson | A47B 87/00 |
| 9,717,339 | B2 * | 8/2017 | Emery | A47B 97/00 |
| 9,930,959 | B2 * | 4/2018 | Franco | A47B 47/0091 |
| 10,052,754 | B1 * | 8/2018 | Coleman, Jr. | B25H 3/003 |
| 10,060,462 | B2 * | 8/2018 | Nilsson | A47B 47/042 |
| 10,070,725 | B2 * | 9/2018 | Nelson | F16B 1/00 |
| 10,104,960 | B2 * | 10/2018 | Devos | A47B 47/042 |
| 10,156,247 | B2 * | 12/2018 | Pensak | A45F 5/02 |
| 10,448,739 | B2 * | 10/2019 | Derelov | A47B 47/042 |
| 2006/0250052 | A1 * | 11/2006 | Davis | A47B 47/042 |
| | | | | 312/107 |
| 2014/0059829 | A1 | 3/2014 | Weber et al. | |
| 2015/0076099 | A1 | 3/2015 | Chang | |
| 2015/0159425 | A1 * | 6/2015 | Algar | E06B 7/28 |
| | | | | 52/202 |
| 2016/0058180 | A1 | 3/2016 | Kane et al. | |

FOREIGN PATENT DOCUMENTS

| | | |
|---|---|---|
| DE | 2541185 A1 | 3/1977 |
| DE | 2541185 A1 | 3/1977 |
| DE | 19827597 A1 | 12/1999 |
| DE | 19827597 A1 | 12/1999 |
| ES | 2112082 A1 | 3/1998 |
| ES | 1093408 U * | 11/2013 |
| ES | 1093408 U | 11/2013 |
| FR | 2974488 A1 | 11/2012 |
| NL | 2010630 C | 10/2014 |
| WO | 02/055168 A1 | 7/2002 |
| WO | 2013/118075 A1 | 8/2013 |

* cited by examiner

FURNITURE ITEM

TECHNICAL FIELD

The present disclosure relates to a furniture item made from a plurality of magnetically joined panels.

BACKGROUND OF THE INVENTION

Modular furniture, such as "flat-pack" furniture is a popular form of furniture. Such flat-pack furniture generally requires a user to assemble the furniture from a number of component parts. For example, flat-pack shelves may be delivered to a customer as a plurality of flat panels and screws or nails for joining the panels together to form the shelves. Such furniture may be dismantled by removing the screws or nails, thus disconnecting the panels. In this dismantled form, furniture can be readily moved, e.g. from one house to another. Some modular furniture may also be of a form where a number of sub-modules (that are individually functional for their intended purpose) may be added together to get a desired size of furniture.

NL 2010630C describes a design of furniture that uses magnets to join together a plurality of panels. The magnets are embedded in front, rear, or side faces of the generally rectangular panels and magnetic attraction between the magnets on two adjacent panels may hold the structure together.

Such conventional designs for furniture have generally been considered satisfactory for their intended purpose but it is desirable to make modular furniture more easily assembled/disassembled and to make furniture more modular so that it may fill the available space to the extent desired by the user rather than having furniture of a few standardized sizes.

SUMMARY OF THE INVENTION

According to a first aspect, the present disclosure provides a furniture item assembled from substantially flat panels, wherein each panel has at least one magnet disposed in or on at least one bevelled edge of the panel so as to provide magnetic coupling between interengaging bevelled edges of adjacent panels.

The use of magnets allows the furniture to be simply constructed from the panels without the use of screws, nails, joints, or joinery. It also allows the design to be rearranged as desired and/or for damaged panels to be replaced easily. Screws or nails can potentially be removed from panels, but doing so can damage the panels (e.g. by gradual enlargement of the receiving holes in the panel) such that each step of unjoining two panels can decrease the possibility of successfully and securely rejoining them again.

Having at least one magnet disposed on a bevelled edge of the panel can allow multiple panels to be joined together in a variety of configurations. In the design shown in NL 2010630C none of the panels has bevelled edges. The top and bottom panels have magnets on their large faces while the side panels have magnets on the smaller end faces to connect with the magnets on the top and bottom faces. This restricts the ways in which the panels may be connected. Moreover, the design of NL 2010630C has non-identical panels, whereas the present disclosure allows identical panels to be joined together in multiple configurations.

Each panel may have front and rear substantially flat opposing faces and wherein the front and rear faces are joined by at least one bevelled edge. Optionally, the front and back faces of the panel may be substantially square or rectangular, and each of the four sides of the square (or rectangle) has a (e.g. generally flat) bevelled edge connecting the front and back faces.

In an embodiment, the front and back faces of each panel are substantially square, and each of the four sides of the square has a respective bevelled edge connecting the front and back faces. With such an arrangement, a plurality of such square panels may all have the same geometrical shape as each other. This facilitates manufacture, allowing just one geometrical shape of panel to be produced. The colouring, material(s), or other decorative features, for example on the faces of the panels, may however vary if desired.

A set of such square panels may be used to make furniture items of different overall configuration, for example to fit the space available in a room of a building. When a furniture item made up of the square panels is disassembled, it may be reassembled in the same configuration or in a different configuration.

Each bevelled edge may extend from the front surface to the rear surface at an internal angle of between 1 and 89 degrees to one of the surfaces, preferably 10 to 80 degrees, and more preferably 45 degrees.

The internal angle is defined as an angle between the bevelled edge and a front or rear surface of the panel, the angle extending inside the body of the panel.

In a case where the front and rear surfaces are parallel, a given bevelled edge will describe a first internal angle with the front face and a second internal angle with the rear face. The sum of the first and second internal angles must be 180 degrees. Of course, where the first and second surfaces are not parallel, the sum of the first and second internal angles will not add up to 180 degrees.

An internal angle of 45 degrees allows the construction of generally square or rectangular furniture, wherein one panel extends at a right angle to another panel such that the bevelled edges can mate.

Angles other than 45 degrees can allow the construction of other shapes of furniture, for example, three rectangular panels forming an equilateral triangle (i.e. triangular prism) where each bevelled edge has an internal angle of 30 degrees. Alternatively, if each bevelled edge has an internal angle of 60 degrees, a hexagon (i.e. hexagonal prism) may be constructed from six panels.

A bevelled edge of a panel may be provided with a single bar magnet lying along the edge, where the north pole of the magnet points generally towards one end of the edge and the south pole points to the other end of the edge. In embodiments, each bevelled edge is provided with at least two magnets, for example a first magnet adjacent to one end of the edge and a second magnet adjacent to the other end of the edge.

Each magnet may be disposed in or on its bevelled edge such that a magnetic pole of the magnet is oriented normal to the surface of its bevelled edge.

This arrangement allows for good coupling between the magnets on two mating bevelled edges.

The magnets may be arranged around each panel in a pattern such that the outward facing magnetic poles alternate in a repeating pattern of North, South in a circumferential direction around the panel.

With such an arrangement, it is possible for each panel to mate with another panel in different orientations because each North on the first panel will match with a South on the second panel, and vice versa.

For example, in one orientation a first bevelled edge of a first square panel may be interengaged with a first bevelled edge of a second square panel, and in another orientation the first bevelled edge of the first square panel may be interengaged with a second bevelled edge of the second square panel. In both orientations, there is magnetic matching between the panels. In embodiments, a magnetic pole of each magnet faces normally outward from its respective bevelled edge; and wherein, starting from a first of the magnets and moving clockwise to adjacent magnets around the panel, the magnetic poles follow a repeating pattern of North, South.

That is, when viewed from a direction normal to a panel, an imaginary line may be drawn from a central point of the panel to the first magnet which has a first polarity pointing out from the bevelled edge (e.g. North), rotating the imaginary line clockwise in the plane of the panel about the normal direction, the line will come to sit on a second (adjacent) magnet which may be on the same or a different bevelled edge of the panel. This second magnet has the opposite polarity from the first magnet (e.g. South) pointing outwards from its bevelled edge. Continuing the process, the imaginary line may be rotated to touch a third magnet having the opposite polarity from the one before, i.e. the second magnet, (e.g. North) pointing out from its bevelled edge.

In embodiments wherein all magnets have the opposite polarity to their adjacent magnets, there is an even number of magnets disposed on a given panel.

Each panel may be symmetrical under a 360/n degree rotation about an axis extending from a center of the front face in a direction normal to the front face, where n is the number of bevelled edges of each panel. This arrangement allows each panel to be used in any orientation. This simplifies the construction of modular furniture.

One or more bevelled edges of each panel may have a protrusion and a depression; wherein a protrusion of a first panel may interengage with a depression of a second panel to inhibit movement between the two panels in at least one direction, preferably wherein the at least one direction is parallel to the bevelled edge.

This provides the advantage of resisting loading on a panel. For example, in a case of a cube formed from six panels, if the bevelled edges are planar then a weight on the top panel will act (via the bevelled edges) to push the side panels outward and the planar faces of the bevelled edges will slide past one another with only friction and the magnets to resist collapse of the cube.

By contrast, in the same setup where the bevelled edges have the interengaging depressions and protrusions, the interengagement of a depression and protrusion will resist this relative movement of the bevelled edges past each other and thus improve the resistance to collapse of the cube. This, therefore, helps to improve the structural strength of furniture assembled from these panels. Specifically, the protrusions and depressions redirect the force from the weight of a horizontal panel pushing against a vertical panel. Without the protrusions and depressions, the force is directed along the bevelled edges (e.g. for bevelled edges at 45° the downward load from gravity is redirected through 45° by the interaction of the bevelled edges to push the vertical panel out from underneath the horizontal panel). With the protrusions and depressions, this force of gravity may be directed to the vertical by the interaction of the protrusions and depressions on the bevelled edges. That is, the protrusions and depressions stop the aforesaid vertical panel from being pushed out from underneath the horizontal panel.

The protrusion and the depression could be provided by the positioning of the magnets with respect to the bevelled edge. For example, a first magnet on a bevelled edge may be positioned with its North pole protruding outwardly of the bevelled edge, and a second magnet on the bevelled edge may be positioned with its South pole depressed inwardly of the bevelled edge. The bevelled edge of a first panel may then mate with a bevelled edge of a second panel with the protruding North pole of one magnet of the first panel engaging in a depression on the bevelled edge of the second panel where the South pole of another magnet of the second panel is located.

Preferably, the protrusion and depression are adjacent each other in a direction along the bevelled edge, and wherein, in that direction, the protrusion and depression describe a substantially sinusoidal profile.

Advantageously, at least two bevelled edges of each panel may have the same arrangement of protrusion and depression such that the protrusion and depression of a bevelled edge of a first panel will match with the protrusion and depression on a first bevelled edge of a second panel and will match with the protrusion and depression on a second bevelled edge of the second panel.

That is, the depressions and protrusions may alternate in the same manner as the magnets' orientations such that, for a given panel design, a depression on each edge may always be in the same position relative to the south pole of the magnet on that edge, and the protrusion may always be in the same position relative to the north pole of the magnet on that edge. This ensures that when two panels are to be joined together, the protrusion and depressions match as well as the north and south poles matching so as to join the panels together. This allows embodiments having protrusions and depressions to have the same flexibility as embodiments without protrusions or depressions, in terms of panels being used in a plurality of orientations.

This profile can help to distribute the (collapse-resisting) load across a larger area of the bevelled edge and is also easily machined. Further, these protrusions, can be large and gently curved so as to be stronger than, for example, a pin and socket design. Further, the sinusoidal pattern may be considered aesthetically pleasing on those bevelled edges that are exposed in the finished furniture. This may also reduce the sharpness of exposed edges (e.g. the angle between the bevelled edge and a face of the panel) by introducing a more gentle curvature at this point. This can improve the safety of the furniture for anyone bumping into it.

The magnetic field of each magnet may extend through the panel.

In these embodiments, if a north pole extends generally normal to the bevelled edge, then the south pole of that magnet will extend out through the rear face of the panel. This south pole can couple with a second magnet's north magnetic pole that is extending out through the rear face of a second panel. In this manner, two identical panels may be magnetically joined together back-to-back. Advantageously, the alternating pattern of magnets in the bevelled edges ensures that a south pole on the first panel will attractively interact with a north pole on the other panel that is in the corresponding position.

This back-to-back joining means that a first furniture cube may be joined with a second furniture cube. Each cube may be made from six panels, or five panels (the cube having one open face) or four panels (the cube having two open faces). A plurality of cubes may be joined together in this manner to produce a larger furniture item, for example, a stack of shelves, a stool, or a table.

BRIEF DESCRIPTION OF THE DRAWINGS

Certain embodiments of the present disclosure will now be described in greater detail by way of example only and with reference to the accompanying drawings in which.

DETAILED DESCRIPTION OF THE INVENTION

Figure 1:
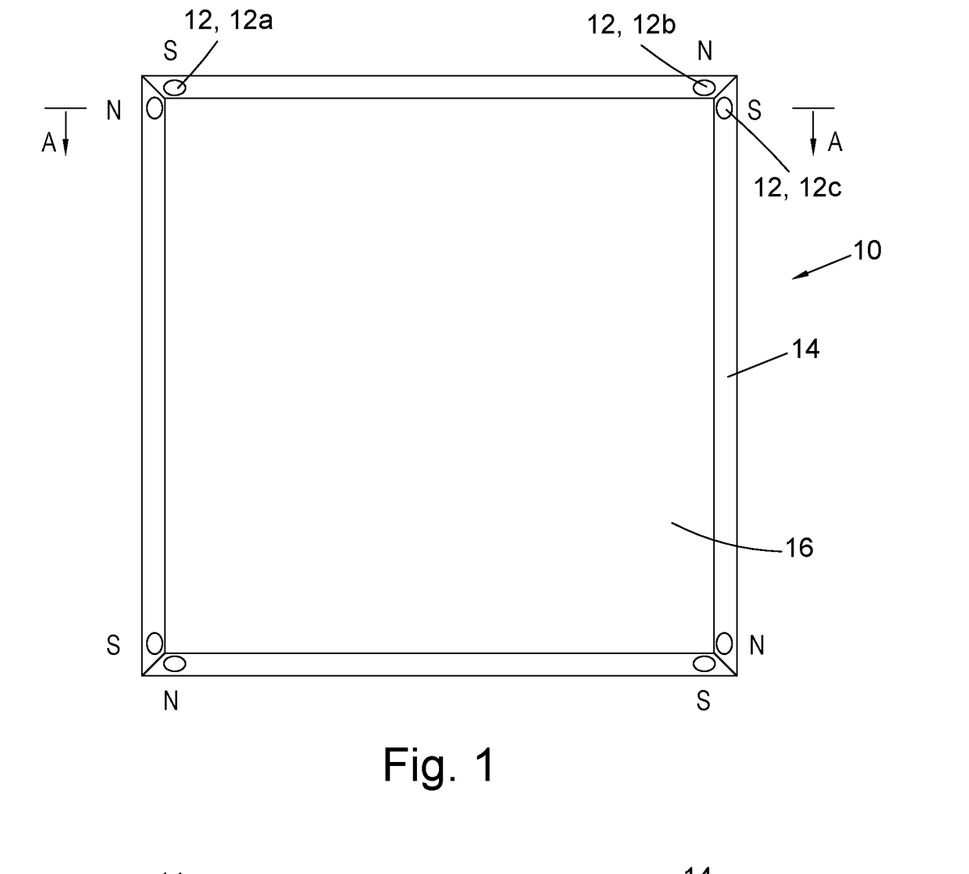
FIG. 1 shows a plan view of a panel according to the present disclosure.
Figure 2:
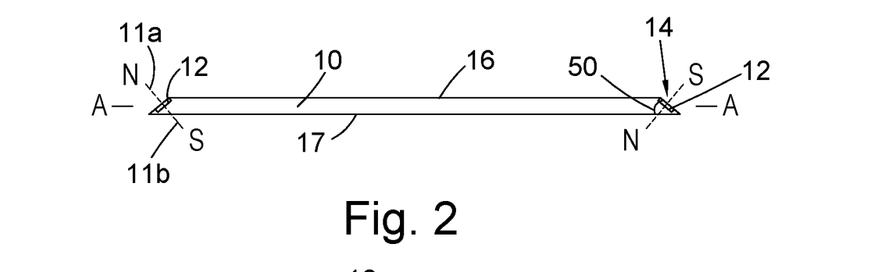
FIG. 2 shows a cross-sectional view of the panel of FIG. 1, along line A-A.

FIG. 1 shows a front-on view of a panel 10 for making an item of modular furniture. FIG. 2 shows a side view of the panel 10 taken along line A-A of FIG. 1. The panel 10 has a front face 16 and a rear face 17 that are preferably substantially flat and extending parallel to each other. Extending between the first 16 and second 17 faces of the panel 10, at the edge of each face, is a beveled edge 14. Magnets 12 are disposed in or on each beveled edge 14. As shown in FIG. 2, the magnets 12 are located on the beveled edges 14 such that a pole 11a of the magnet points outward from the beveled edge 14, substantially normal to the plane of the beveled edge 14. The opposite pole 11b, points outward through the rear face 17.

As described in more detail below, the magnets 12 on the beveled edges 14 allow two or more panels 10 to be magnetically joined together at their beveled edges 14.

Each beveled edge 14 preferably forms an internal angle of 45 degrees with respect to the rear face 17, as shown in FIG. 2. This allows two panels 10 to join together to form a right angle (90 degrees). In other embodiments, each beveled edge 14 may form an internal angle of 10 degrees, 20 degrees, 30 degrees, 40 degrees, 50 degrees, 60 degrees, 70 degrees or 80 degrees with respect to the one of the faces 16, 17. Of course, any internal angle between 1 and 89 degrees is envisaged—90 degrees does not correspond to a "beveled edge" 14 within the meaning of the present disclosure as such an arrangement would not allow identical panels 10 to connect at an angle to make a 3D piece of modular furniture.

Preferably, all the beveled edges on a panel have the same internal angle with respect to the rear face. This improves the symmetry of the panels allowing them to be used in several orientations.

In the embodiments shown, the front 16 and rear 17 faces are substantially parallel, and consequently a given flat beveled edge 14 will have two internal angles, one with the front face 16 and one with the rear face 17. The sum of these two internal angles will equal 180 degrees provided the front and rear faces are parallel and the beveled edge defines a straight line between the front and rear faces.

As shown in FIG. 1, the outward facing poles of the magnets 12 preferably follow an alternating pattern around the beveled edges 14 of a given panel 10. That is, arbitrarily selecting a first magnet on a panel, e.g. magnet 12a in the upper left corner of FIG. 1, which has (e.g.) its south pole facing outward from its beveled edge 14. Then, moving to the next magnet clockwise around the panel (in the orientation shown in FIG. 1), that magnet 12b has its north pole pointing out from its beveled edge 14. Then, moving on to the next magnet clockwise around the panel, that magnet 12c has its south pole facing outwards from its beveled edge 14. This alternating pattern repeats for all magnets 12 on a given panel 10 around the entire panel 10 back to the first magnet 12a.

Thus, the magnets may be arranged around each panel in a pattern such that the outward facing magnetic poles alternate in a repeating pattern of North, South in a circumferential direction around the panel.

Preferably, all panels 10 used to make a given piece of modular furniture have the same alternating pattern. That is, the panels 10 are all identical.

Figure 3:
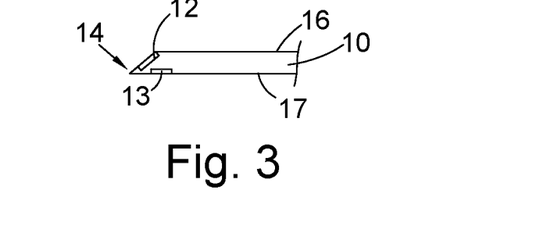
FIG. 3 shows a partial cross-sectional view of a second embodiment of a panel having an additional magnet.

In some embodiments, the panel 10 may also have magnets 13 located in the rear face 17 of the panel 10, as shown in FIG. 3. These magnets 13 may assist with joining together two panels 10 along their rear faces 17. For example, this can help to join together two cubes made from the panels, placed adjacent to each other. The magnets 13 on the rear face 17 preferably also have an alternating pattern equivalent to that described above for the magnets 12 on the beveled edges.

Figure 4A:
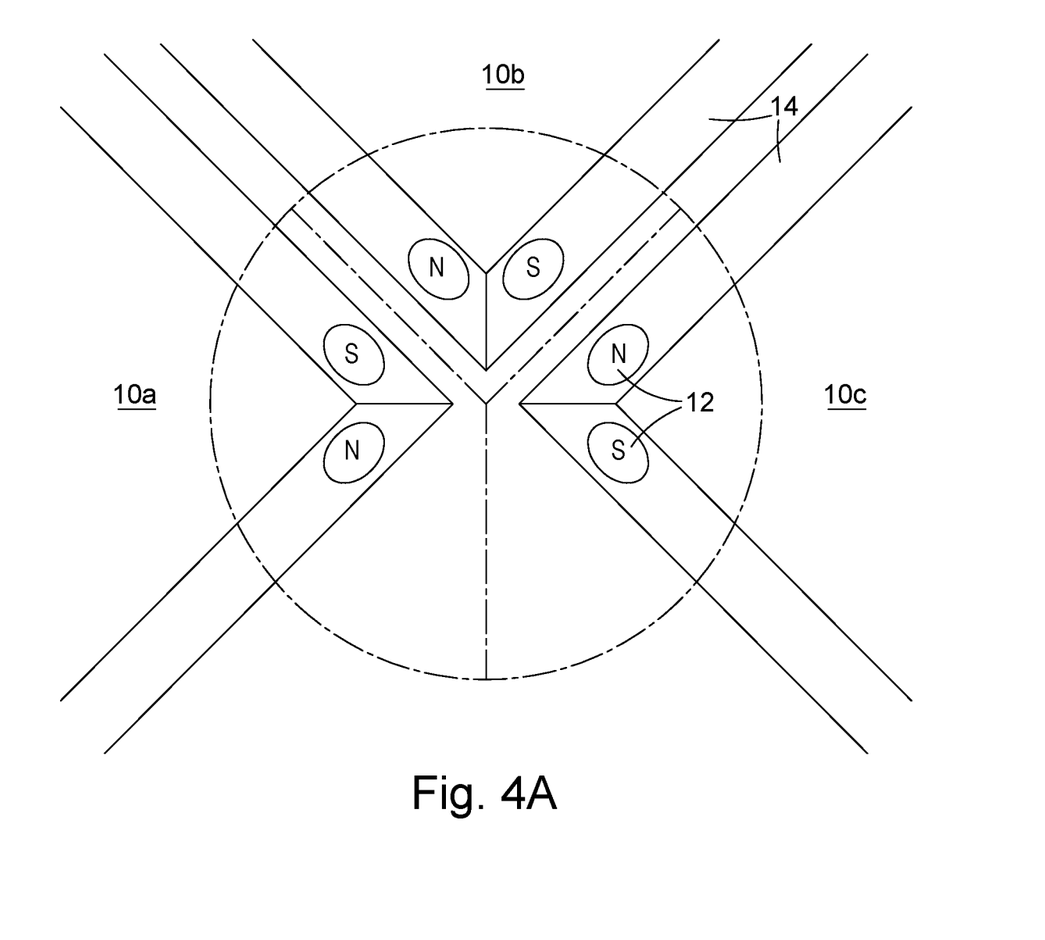
FIG. 4A shows a flattened perspective of three panels meeting to form a corner of a cube.

FIG. 4A shows a flattened view of three panels 10a, 10b, 10c meeting at a corner. Each panel 10 has an identical pattern of magnets 12 on its beveled edges 14. As a result of the pattern, each magnet 12 on a first 10a of the panels 10 faces a magnet 12 on a second 10b of the panels 10 that has the opposite magnetic pole 11 facing outwards. That is, each magnet 12 having its north pole facing out from its beveled edge 14 is brought into proximity/contact with another magnet having its south pole facing out from its beveled edge. As a result, all magnets 12 of the three panels 10a-c are magnetically attracted to their opposite number on an adjacent panel. This can result in a strong join between the panels 10a-c as no two magnets in close proximity to one another are repelling one another.

Figure 4B:
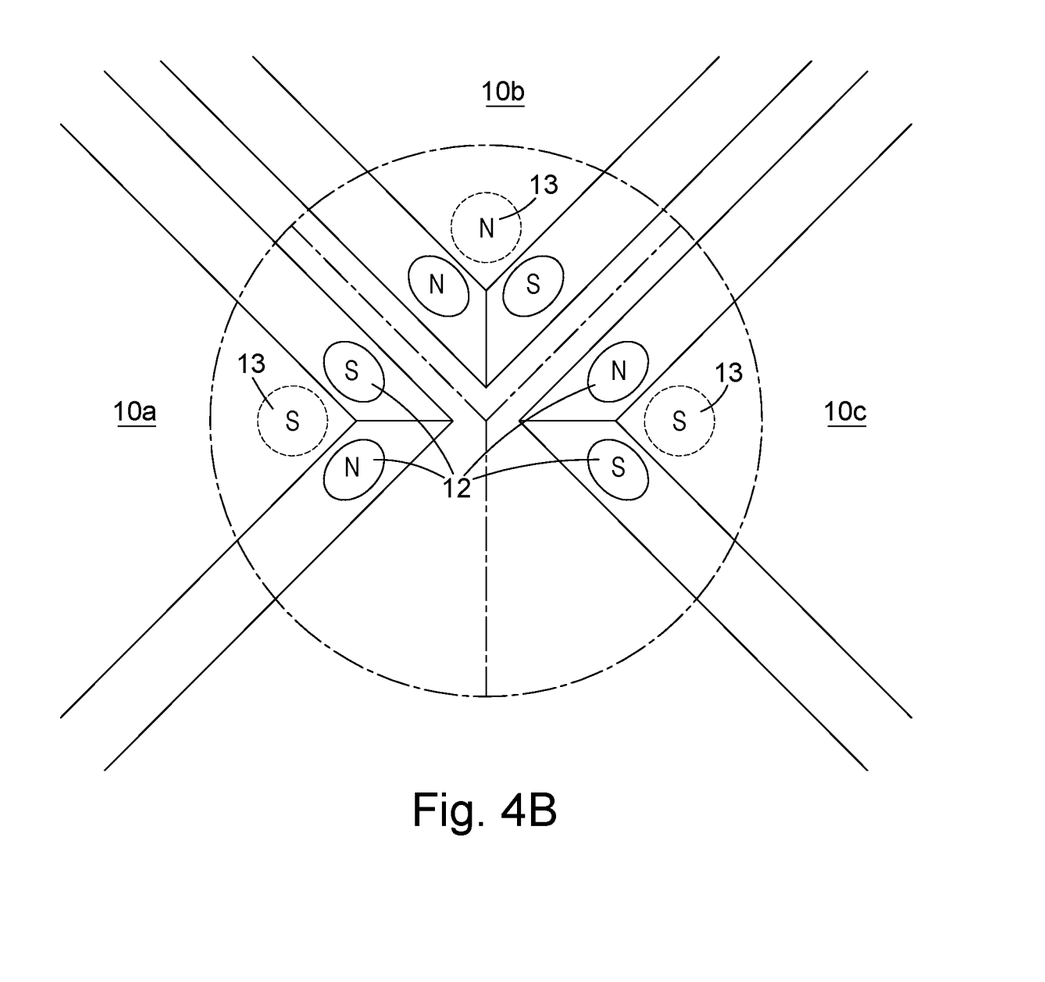
FIG. 4B shows a flattened perspective of three panels of the second embodiment meeting to form a corner of a cube.

FIG. 4B shows the same view as FIG. 4A, but with the addition of magnets 13 on the rear face 17 of each panel 10.

Figure 5:
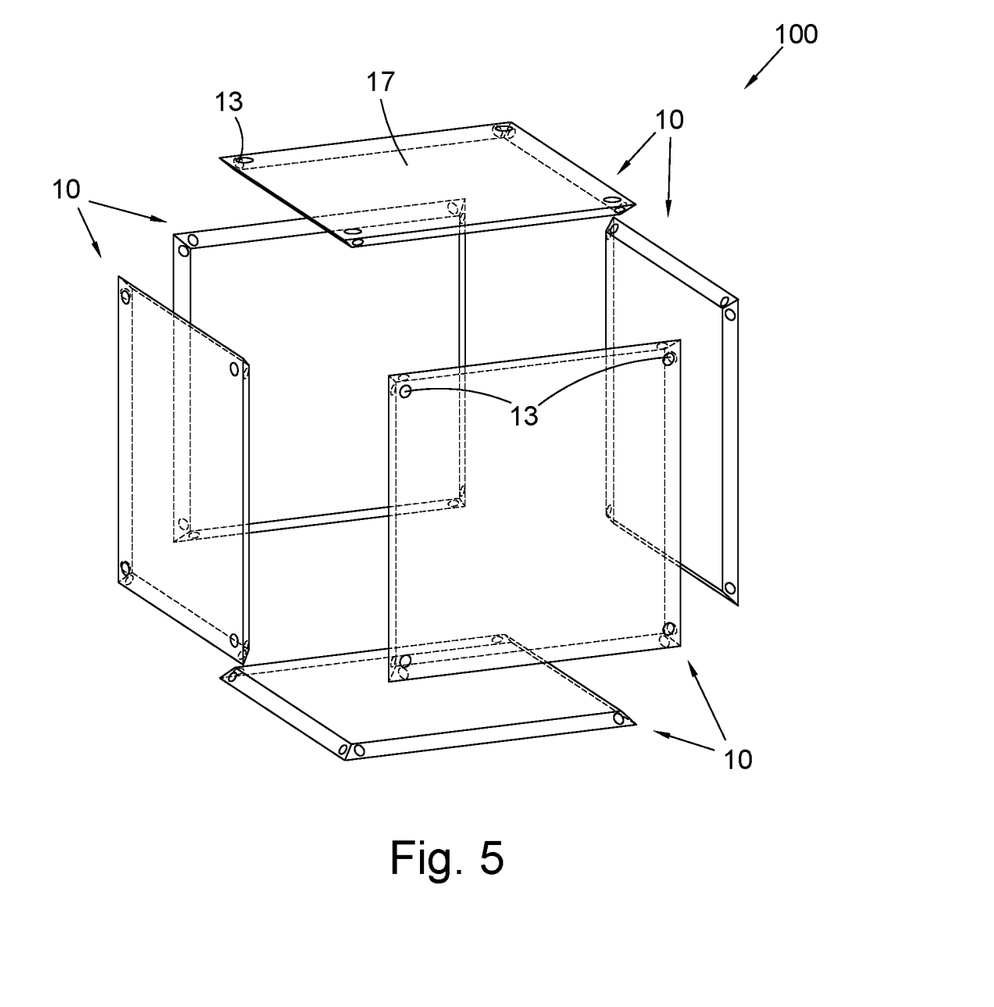
FIG. 5 shows an exploded perspective view of six panels meeting to form a cube.

FIG. 5A shows an exploded view of an item of modular furniture 100, in this case a cube, formed from 6 identical panels 10. At each corner of the cube, three panels (e.g. panels 10a-c) meet and the magnets 12 join the three panels together. The panels 10 depicted are those with the magnets 13 on the rear face 17, but in the arrangement shown these magnets 13 have no particular effect on the magnetic bonding between adjacent panels 10.

FIG. 5B shows an exploded view of a second item of modular furniture 200 made up from several iterations of the cubic modular furniture 100 shown in FIG. 5A and described above. In this example of modular furniture 200, the magnets 13 on the rear face 17 of each panel 10 may assist in connecting together panels at their rear faces 17. However, it must be noted that magnets 13 on the rear face are not essential for joining together two panels at their rear faces 17. This is because the magnetic fields of the magnets 12 on the beveled edges 14 may extend through the rear face 17 of each panel 10.

These magnetic fields extending through the rear face 17 of each panel 10 have the same alternating pattern of magnetic polarity as described above. This allows two panels to be magnetically joined together at their rear faces 17 using only the magnets 12 on the beveled edges 14.

Due to the preferred alternating pattern of magnets, each panel may be rotated by 90 degrees about an axis normal to its front face 16 and still magnetically connect to the other panels 10. That is, the panels 10 have four-fold rotational symmetry. Of course, panels with different shapes, e.g. triangular panels will have different rotational symmetry. However, provided there are two magnets 12 on each beveled edge of the panel, the preferred alternating pattern may be maintained for any shape of panel.

Figure 6:
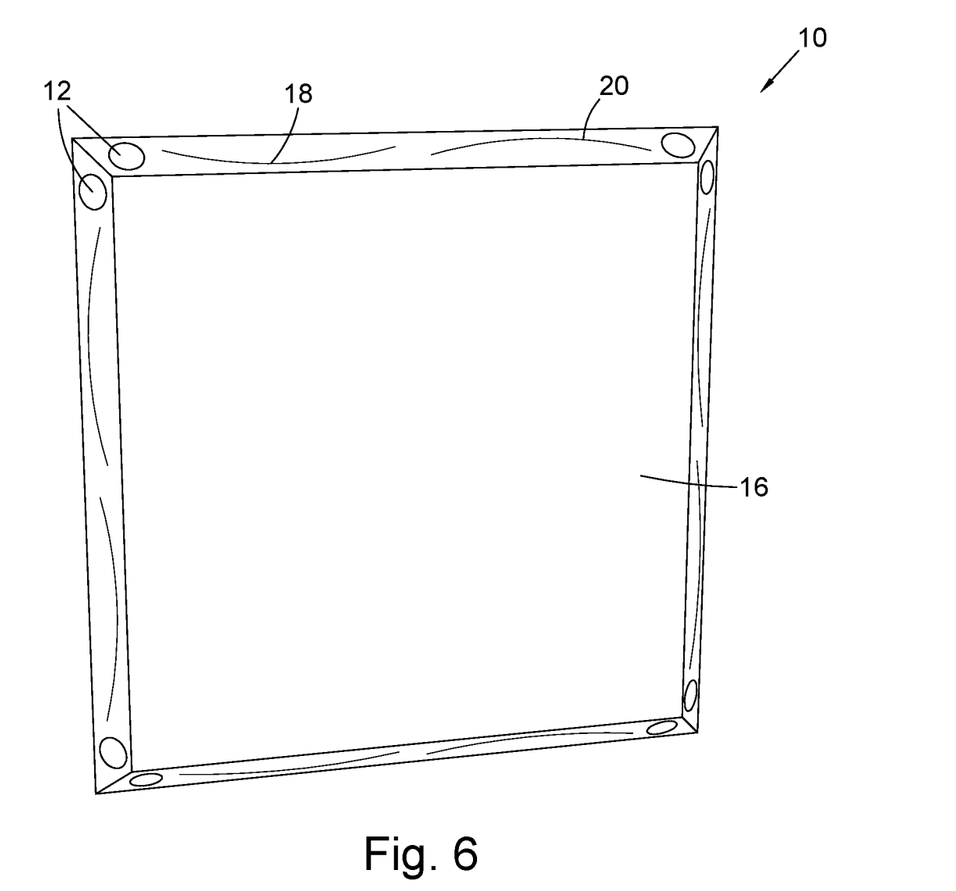
FIG. 6 shows a schematic perspective view of a panel according to a third embodiment having protrusions and depressions along the bevelled edges.

FIG. 6 shows another embodiment of a panel 10. This panel 10 is identical to the panels hereinbefore described in terms of having two substantially flat faces 16, 17, magnets disposed in or on beveled edges etc. This panel differs from those panels by providing a protrusion 20 and a depression 18 in each beveled edge 14.

The protrusion 20 on a first panel 10 is sized and shaped so as to mate with the depression 18 on another identical panel 10. Preferably the protrusions and depressions follow the same alternating pattern as described above for the magnets. That is, each magnet 12 with its north pole facing outwards from its beveled edge 14 may be adjacent a depression 18, while each magnet 12 with its south pole facing outwards from its beveled edge 14 may be adjacent a protrusion 20. This arrangement maintains the rotational symmetry of the panels 10 described above.

In the example shown in FIG. 6, the depression 18 and protrusion 20 on a given beveled edge 14 follow a substantially sinusoidal profile along the beveled edge 14 (i.e. in a direction joining two magnets 12 on the same beveled edge 14. Other shapes of protrusion 20 and depression 18 are envisaged, such as a pin and socket arrangement (not shown). Preferably, the depression 18 and protrusion 20 are symmetrically distributed along the beveled edge 14 so as to maintain the interchangeability and rotational symmetry of the panels 10.

Figure 7:
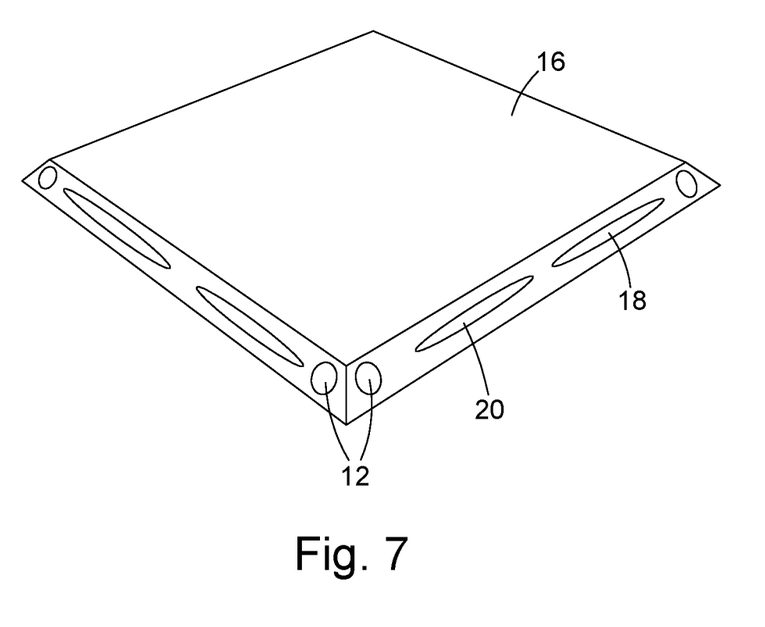
FIG. 7 shows a CAD drawing of the panel of FIG. 6m.

FIG. 7 shows a CAD drawing that shows the same substantially sinusoidal pattern of protrusion 18 and depression 20 as depicted schematically in FIG. 6.

In the embodiments thus far described, each panel has two magnets 12 per beveled edge. However, it is possibly to provide only a single magnet 12 per beveled edge 14 if desired. For example, a bevelled edge of a panel may be provided with a single bar magnet lying along the edge, where the north pole of the magnet points generally towards one end of the edge and the south pole points to the other end of the edge.

Figure 8:
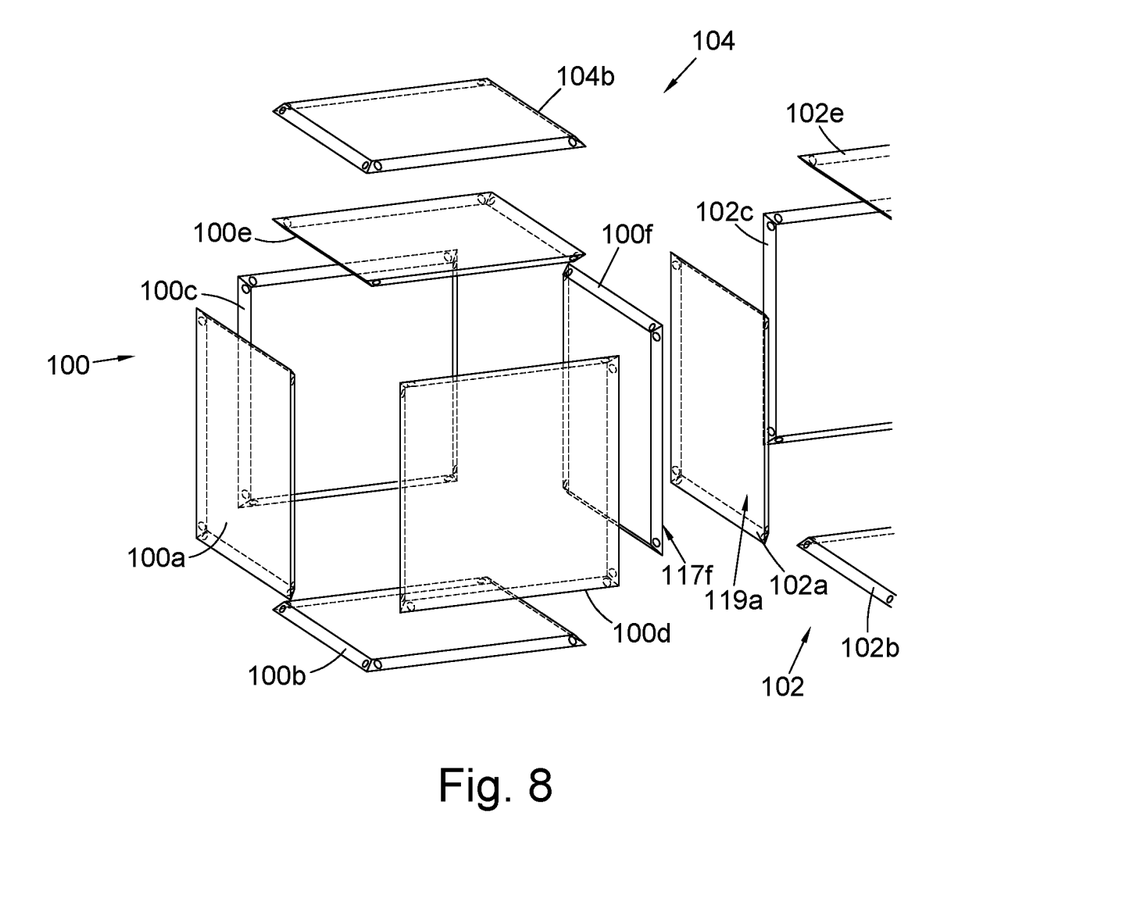
FIG. 8 shows two panels joining together back-to-back.

FIG. 8 shows an exploded view of a multiple furniture items 100, 102, 104 joined together in a back-to-back fashion into a larger furniture item.

Two panels 100f, 102a are joined together back-to-back. These panels 100f, 102a do not require magnets on their back faces 117f, 119a to join together in this position. The magnetic fields from the magnets on the bevelled edges extend through the body of each panel 100f, 102a. This allows the magnets 12 on the bevelled edges 14 of two identical panels to interact so as to magnetically join the panels together back-to-back.

In embodiments with the alternating pattern of the magnets (N, S, N, S etc.), when two panels 100f, 102a are held back-to-back, the south poles of magnets 12 on the first panel 100f will be closest to north poles of magnets 12 of the second panel 102a. Similarly, the north poles of magnets 12 of the first panel 100f will be closest to south poles of magnets 12 of the second panel 102a. Thus, all magnets 12 on the first panel 100f will be magnetically attracted to their opposite number on the second panel 102a, so that the panels 100f, 102a are securely joined together back-to-back.

This feature allows multiple furniture items according to the present disclosure (each made of 4, 5 or 6 identical panels) to be joined together into a larger furniture item.

In FIG. 8, the first cube 100 is made from six panels 100a-f and this cube 100 is magnetically coupled to another cube 102 made from six panels (only four of which are depicted, 102a, b, c, e). Panels 102a and 100f join back-to-back such that the first and second cubes 100, 102 are magnetically joined together by magnets 12.

A third cube 104 formed from six panels (only one depicted 104b) is magnetically joined to a top panel 100e of the first cube 100. The depicted panel 104b of the third cube 104 joins in the aforesaid back-to-back fashion to a top panel 100e of the first cube 100 via magnets 12. Thus, a larger furniture item may be constructed in modular fashion by joining together multiple independent items formed from panels. That is, the first cube 100 is self-supporting, as is the second cube 102, and these cubes may be magnetically joined together to form a larger furniture item.

If a single panel 100d is removed from the first cube 100, then the first cube 100 would form an open-faced box. This open-faced box may be used to store items in the manner of a shelf. Multiple open-faced boxes joined together in the manner described above for the cubes 100, 102, 104, may thus create a stack of shelves for storage.

Magnets 13 may optionally be disposed in the back faces of each panel in the manner shown and described with reference to FIGS. 4B and 5, to enhance the strength of the magnetic coupling between adjacent panels that are joining together back-to-back. However, these are not essential as the magnetic field of the magnets 12 on the bevelled edges 14 of each panel extend through their respective panel as described above.

Figure 9:
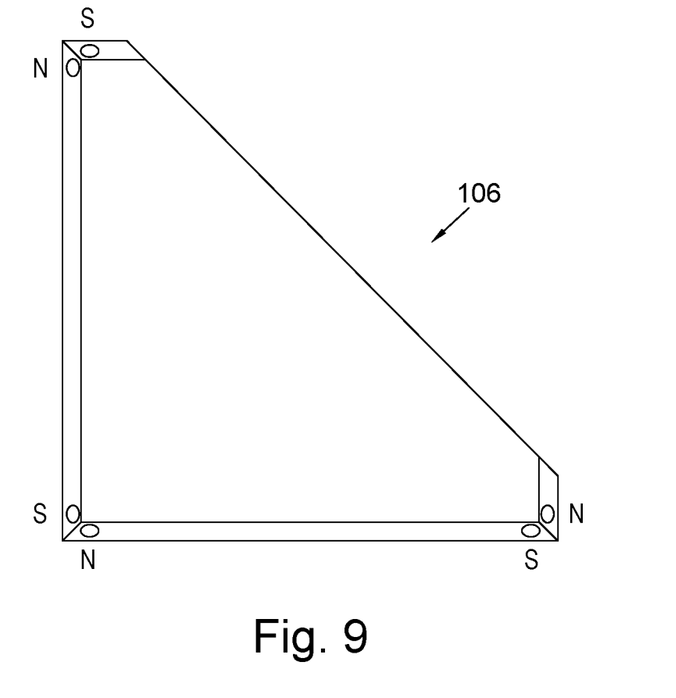
FIG. 9 shows a panel having one corner removed.

FIG. 9 shows an alternative design of a panel 106 having a generally triangular shape. This panel 106 may join to four other panels, in the same manner as the square panel 10 shown in FIG. 1, except that two of those four panels will not connect to the generally triangular panel at one of their respective magnets (i.e. at the cut-away corner of the depicted panel 106).

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

We claim:

1. A furniture item assembled from flat panels, each panel having a plurality of bevelled edges, wherein each panel has at least one magnet disposed in or on each bevelled edge of the panel so as to provide magnetic coupling between interengaging bevelled edges of adjacent panels; wherein each of the magnets comprises an outward facing magnetic pole and the magnetic poles are arranged around each panel in a pattern such that the outward facing magnetic poles alternate in a repeating pattern of North, South in a circumferential direction around the panel; and wherein each magnet is disposed in or on its bevelled edge such that a magnetic pole of the magnet is oriented normal to the surface of its bevelled edge.

2. A furniture item as claimed in claim 1, wherein each panel has front and rear flat opposing faces and wherein the front and rear faces are joined by at least one bevelled edge.

3. A furniture item as claimed in claim 2, wherein the front and back faces of each panel are square, and each of the four sides of the square has a respective bevelled edge connecting the front and back faces.

4. A furniture item as claimed in claim 2, wherein each bevelled edge extends from the front surface to the rear surface at an internal angle of between 1 and 89 degrees to one of the surfaces.

5. A furniture item as claimed in claim 2, wherein each bevelled edge extends from the front surface to the rear surface at an internal angle of between 10 and 80 degrees to one of the surfaces.

6. A furniture item as claimed in claim 2, wherein each bevelled edge extends from the front surface to the rear surface at an internal angle of 45 degrees to one of the surfaces.

7. A furniture item as claimed in claim 1, wherein each panel is symmetrical under a 360/n degree rotation about an axis extending from a center of the front face in a direction normal to the front face, where n is the number of bevelled edges of each panel.

8. A furniture item as claimed in claim 1, wherein, one or more bevelled edges of each panel has a protrusion and a depression; wherein a protrusion of a first panel may interengage with a depression of a second panel to inhibit movement between the two panels in at least one direction.

9. A furniture item as claimed in claim 8, wherein the at least one direction is parallel to the bevelled edge.

10. A furniture item as claimed in claim 8, wherein the protrusion and depression are adjacent each other in a direction along the bevelled edge, and wherein, in that direction, the protrusion and depression describe a substantially sinusoidal profile.

11. A furniture item as claimed in claim 8, wherein at least two bevelled edges of each panel have the same arrangement of protrusion and depression such that the protrusion and depression of a bevelled edge of a first panel will match with the protrusion and depression on a first bevelled edge of a second panel and will match with the protrusion and depression on a second bevelled edge of the second panel.

12. A furniture item according to claim 1, wherein the magnetic field of each magnet extends through the panel.

\* \* \* \* \*